United States Patent [19]

König

[11] 4,428,721
[45] Jan. 31, 1984

[54] DOUGH MOLDING MACHINE

[76] Inventor: Helmut König, Usprungweg 70-72, A-8045 Graz, Austria

[21] Appl. No.: 432,624

[22] Filed: Oct. 4, 1982

[30] Foreign Application Priority Data

Oct. 2, 1981 [AT] Austria ................................. 4237/81

[51] Int. Cl.³ .......................... B29C 3/02; B29C 3/06; A21C 9/08
[52] U.S. Cl. ..................................... 425/136; 425/167
[58] Field of Search ............... 425/136, 140, 154, 165, 425/162, 167; 264/40, 1

[56] References Cited

U.S. PATENT DOCUMENTS

| | | | |
|---|---|---|---|
| 3,078,515 | 2/1963 | Wintriss | 425/154 |
| 3,188,704 | 6/1965 | Sukava | 425/136 |
| 3,303,537 | 2/1967 | Mislan | 425/137 |
| 3,452,399 | 7/1969 | Blumer | 425/154 |
| 3,564,657 | 2/1971 | Aoki | 425/154 |
| 3,834,848 | 9/1974 | Farrell | 425/136 |
| 3,918,866 | 11/1975 | Eichenberger et al. | 425/136 |

*Primary Examiner*—Willard E. Hoag
*Attorney, Agent, or Firm*—Townsend and Townsend

[57] ABSTRACT

In a machine for molding or forming dough pieces, particularly kaisersemmels oder starsemmels, a molding tool carrier is mounted for upward and downward movement in a frame. The molding tool carrier carries at least one molding tool, particularly a pestle for forming the upper surface of the dough piece resting in a hollow of a molding dish. In order to avoid that due to dough adhering to the molding or forming tools dough pieces are placed one upon the other in the molding dish so that by the excessive amount of dough expelled by the molding tool damages in the machine occur, a sensor means is provided for supervising the neighborhood of those zones of the molding dish in which the dough is expelled during normal operation of the machine. If the sensor means senses excessive amount of dough, the drive means for the upward and downward movement of the molding or forming tools is disconnected, preferably the drive motor is shut off from the electric power supply. Preferably the sensor means is constituted by a rubber hose fixed to the bottom surface of a stripper plate surrounding the pestle. The hose contains water under pressure and is connected to a pressure switch which creates an electric shut off signal for the drive means whenever the sensor hose is compressed by excessive amount of dough.

12 Claims, 6 Drawing Figures

DOUGH MOLDING MACHINE

BACKGROUND OF THE INVENTION

The invention refers to a dough molding machine, comprising at least one upwardly and downwardly moving molding tool which acts on the dough portion resting on a support, mostly constituted by a molding dish.

As is known, automatically working machines are used in modern big plants for producing molded pastry. This provides the advantage of an economic production in case of an undisturbed sequence of all functional operations, so that great amounts of shaped pastry can be produced within an extremely short time interval with an only low need of operating personnel. It is, however, disadvantageous that at several critical locations there is no supervising person, so that in case of any operating disturbances one can intervene only if the operating disturbance is recognized at a still supervised location on account of an irregular operation. Such critical locations in fully automatic plants for shaped pastry are, for example, the transfer locations of conveyor belts which transfer the dough portions from one functional location to the other and further the delivery of dough portions from fermentation or roofing container hangers, the transfer locations within the final fermentation or roofing container and above all those operating locations at which the shaped pastry is formed by molding tools, particularly by so-called jogging means. During molding, a substantial pressure is exerted on the dough portion resting on its support, so that tacky dough types frequently remain hanging on the molding tool during upward movement of this tool. This has as a consequence that this dough portion adhering on the molding tool is put on top of the following dough portion resting on its support. Thus, the molding tool becomes offered a double portion of dough, and in most cases both dough portions are transferred by the upwardly moving molding tool and are put on the following (third) dough portion. Thereby the amount of dough surrounding the molding tool may become so great that the dough can not sufficiently be expelled so that the downwardly molding tool encounters an insurmountable resistance. Because the whole drive mechanism in most cases is of a very stable construction, this drive mechanism is subjected to an excessive stress and a fracture of the machine or of the molding tool occurs, particularly of the molding pestle of jogging machines for Kaiser-semmels (Kaisersemmeln).

THE STANDARD OF ART

One has already provided stripper plates for stripping dough portions remaining adhered on the molding tool, particularly when operating with tough doughs. The stripper plate can, however, not always reliably fullfill its function, and frequently the stripper plate breaks so that the mentioned risk is still existing. Apart therefrom, the siding space for the dough is reduced or confined by the stripper plate, so that, in case a dough portion remains adhering on the molding tool, the stripper plate still increases the described dough stowing and, respectively, is primarily subjected to the pressure action of the excessive dough volume expelled by the pestle.

OBJECTS AND SUMMARY OF THE INVENTION

It is an object of the invention to avoid these disadvantages of the known dough forming machines.

It is an object of the invention to improve a dough molding machine of the initially described type such that any stacking of dough portions results in an automatic alarm signal.

It is an further object of the invention to provide for a shut-down of the whole plant whenever an operating disturbance of the type described above occurs.

It is still another object of the invention to avoid any fracture of machine parts or any injury of the stripper plate.

The invention solves this task in that at least one sensor means is provided for supervising that area of the support and, respectively, the surrounding of this support, which is located outside of the normal expelling area of the dough portion, which sensor means becomes effective by the dough expelled in an excessive amount by the molding tool, said sensor means being connected to signal delivery means. In this manner, that area of the support and, respectively, the surrounding thereof which is located around the normal expelling area of the dough portion is supervised whether or not dough expelled by the molding tool enters said area. If this is the case, the sensor means gives a response and a signal is produced. This signal may be an alarm signal, for example a bell signal or an optical signal, so that the supervising person can shut down the plant even if this person stays at another location. Preferably, the sensor means comprises a switch able to immediately shut down the machine drive, because in this manner a maximum security is obtained.

For the purpose of supervising all areas into which any excess of expelled dough can enter, it is, according to a preferred embodiment, convenient that the sensor means or a plurality of sensors is arranged along an arc around the normal expelling area of the dough portion. It is conceivable to use optical sensors, capacity sensors and so on, but the area surrounding the whole normal expelling area can also be checked by one single mechanical sensor if, according to a preferred embodiment of the invention, the sensor means is a, preferably elastic, length of a hose filled with a hydraulic or pneumatic fluid and connected to a switch actuated by this fluid. This length of hose becomes deformed by excessively expelled dough and the pressurized fluid contained within the length of hose actuates the switch on account of the change in fluid pressure effected by such deformation. Such a length of hose could be arranged on the support, for example at the border of the molding dish carrying the dough portion. This would, however, result in a complicated arrangement, so that is substantially more simple if the hose is, according to a further development of the invention, arranged at that side of a stripper plate which faces the support. During molding the dough portion, for example during the actuation of a jogging means for Kaiser-semmels (Kaisersemmeln), such a stripper plate is located at a small distance above the support, for example the border of the molding dish, so that excessively expelled dough enters the annular gap between the stripper plate and the border of the molding dish and deforms the length of hose. Such an arrangement can, with an only low expenditure, also be used with such dough molding machines in which at least two molding tools are arranged on a common molding tool carier arranged for being swivelled around a horizontal axis, noting that with each of these molding tools an individual stripper plate is associated. In this case, a length of hose is, according to a specific embodiment of the invention, arranged at each of these stripper plates, and all lengths of hoses are connected to a common conduit being externally passed through the axis of the molding tool carrier. This conduit is connected to the signal delivery device or, respectively, the switch for shutting down the machine drive, so that only one single signal delivery device is required for all molding tools and the operation of this device is independent from the condition which one of all molding tools is just in operation.

According to another embodiment of the invention the arrangement can, however, also be such that the sensor comprises a pivoting lever moved by the expelled dough, particularly a pivoting lever pivotally supported on the stripper plate, within the pivoting area of which lever a switch is located. This very simple construction can be realized with an only low expenditure by using elements, for example limiting switches, available on the market.

After shutting down the machine drive by means of the switch controlled by the sensor means, stowage of dough can be remedied. For facilitating this function, the switch actuated by the sensor means may comprise a time delay element, so that shutting down of the machine drive is always effected in raised position of the molding tool.

DESCRIPTION OF THE DRAWINGS

The subject of the invention is schematically represented in the accompanying drawing which show preferred embodiments of the invention.

Figure 1:
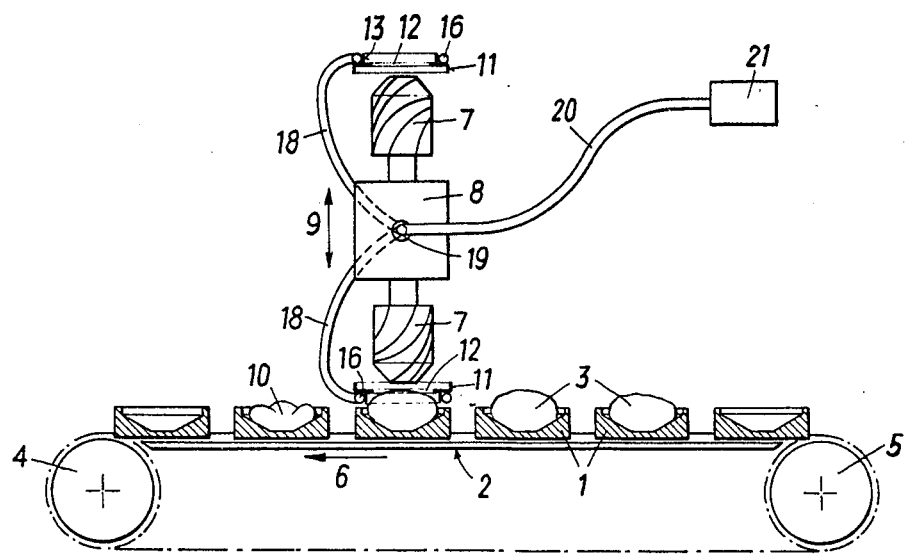
FIG. 1 shows, partially in section, an embodiment comprising a length of hose forming the sensor means.
Figure 2:
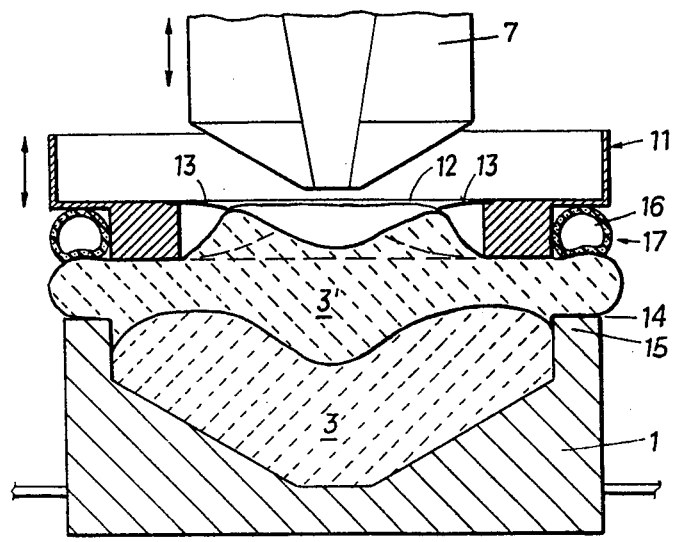
FIG. 2 shows a detail of FIG. 1 in an enlarged scale.

In the embodiment according to FIGS. 1 and 2, the dough forming means of a dough molding machine, namely a jogging machine, are shown. This machine has, in a manner known per se, an endless chain of molding dishes 1, respectively dough dishes, which form the support 2 for the dough portions 3 to be molded. The chain of molding dishes 1 is passed around two return wheels 4, 5 and driven by a drive means not shown for being step-wisely moved in direction of arrow 6. Of course, the supports 2 for the dough portions, which are formed by the molding dishes 1, can be arranged in rows one beside the other. Above the upper run of the molding dish chain 1, a plurality of molding pestles 7 is arranged on a common molding tool carrier 8 in a number corresponding the the number of molding dishes per row, the molding tool carrier 8 being upwardly and downwardly moved in direction of the double arrow 9 by a drive means not shown in a manner well known for one skilled in the art. The molding pestles 7 designed as joggers can be rotated during downward movement, so that the desired stars can be worked in a manner known per se into the dough portions 3. A dough portion molded in this manner is given the reference numeral 10.

A stripper plate 11 is associated with the molding pestle 7 and has an opening 12 for each molding pestle 7 (FIG. 2) through which the molding pestle 7 passes during the molding operation. The stripper plate 11 has stripper platelets 13 which are arranged within this opening 12, the pestle 7 on its downward stroke screws into the space left free between the platelets. The stripper plate 11 can be upwardly and downwardly moved in synchronism with the molding pestle 7 and is resiliently carried by the molding tool carrier 8 by means of springs, not shown. During the downward movement of the molding pestle 7, the stripper plate 12 contacts, at the end of its downward stroke, abutments (not shown) so that the stripper plate 12 is stopped, whereupon the molding pestle 7 performs its molding operation. If a dough portion sticks on the molding pestle 7 during the subsequent upward movement of the molding pestle 7, this dough portion is, after an advancing step of the molding dish chain, put onto the following dough portion during the subsequent downward stroke of the molding pestle (FIG. 2). The downwardly moving pestle 7 encounters thus on the molding dish 1 the double amount of dough, so that dough, particularly of the dough portion 3' sticking on the molding pestle 7, is excessively expelled by the penetrating molding pestle 7 and parts of the dough enter the annular gap 14 between the border 15 of the molding dish 1 and the bottom edge of the stripper plate 11 and, respectively, the stripper platelets 13 surrounding the opening 12. Said parts of the dough become squeezed between the stripper plate 11 and, respectively, the stripper platelets 13 thereon, on the one hand, and the border 15, on the other hand. Thus, the dow is expelled in outward direction, whereby a sensor means 17 constituted by an elastic length 16 of hose fixed to the bottom side of the stripper plate 11 becomes deformed. This length 16 of hose senses whether or not dough is present outside of the normal expelling area of the dough portion, or, in other words, outside the area occupied by the deformed dough piece if the molding operation proceeds normally. The hose length 16 is filled with a pressure fluid, for example, pressurized air or water. Any deformation of the hose length 16 thus results in a pressure shock within the hose length 16, which pressure shock is transmitted through a tubular conduit 18, (FIG. 1) connected to said length of hose, to a channel 19 arranged within the molding tool carrier 8 and laterally passed out of the molding tool carrier 8 and connected to a tubular conduit 20 which is passed to a switch 21 actuated by the pressure fluid and shutting down the machine when the mentioned pressure shock occurs. During normal operation, the hose length 16 is not contacted by the dough because it is only on laterally expelling the dough around the stripper platelet 13 that the hose length 16 becomes compressed. Such lateral expelling of the dough occurs, however, only if a plurality of dough portions are stacked one above the other, so that the dough flows over the border 15 of the molding dish 1. The conditions can be selected such that the mentioned shut down of the machine by means of the switch 21 is effected only if more than two dough portions are stacked one above the other within the molding dish 1, because it can frequently be observed that the stripper platelet 13 can strip off from the molding pestle 7 two dough portions jogged together. Furthermore, the switch 21 can be adjusted such that this switch performs its switching operation only if the hose length 16, for example formed of a rubber hose, is relaxed after its compression, so that the machine is shut down during the upward stroke of the molding pestle 7. The machine is then stopped in a position in which the dough portions 3, 3' (FIG. 2) jogged together can easily be removed from the molding pestles 7 by hand, whereupon the machine can again be started. Such a delayed response of the switch 21 can, in a manner known per se, easily be obtained, for example by a time delay element associated with the switch or with the electrical circuit thereof.

As is shown in FIG. 1, the molding tool carrier 8 can be designed for being swivelled around a horizontal axis, so that more than one row of molding pestles 7 can selectively be brought in a position ready for operation. These molding pestles 7 can be identical one with the other but need not be identical. Mutually identical sensors 17 can be provided for all molding pestles 7, the individual tubular conduits 18 being passed the the channel 19 being common for all tubular conduits 18. This channel 19 is externally passed through the pivotal axis of the molding tool carrier 8 and tightly connected for the tubular conduit 20. In this manner, the same sensors provide security against any damage of the machine in any arbitrary pivotal position of the molding tool carrier 8.

Figure 3:
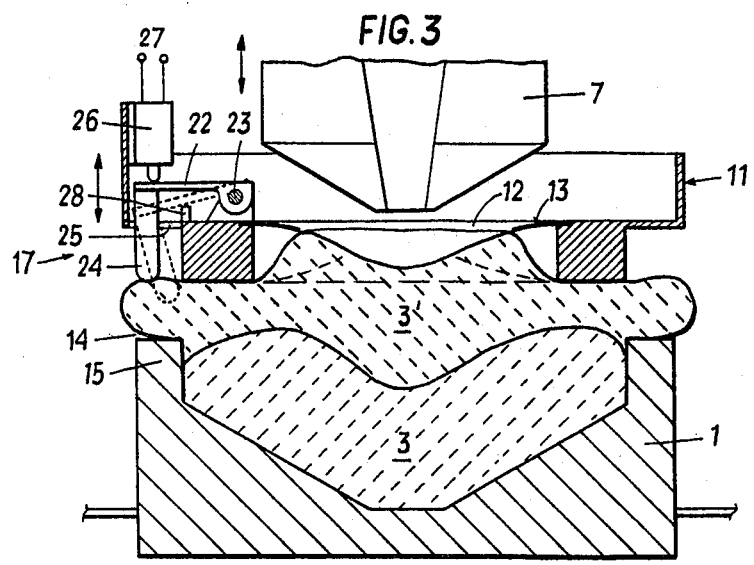
FIG. 3 shows a modified embodiment having a pivotal lever as the sensor means.

In the embodiment according to FIG. 3 the sensor 17 is formed by a pivotal lever 22 which is arranged on the stripper plate 11 for pivotal movement around a horizontal axis 23 and extends with a sensing head 24 through an opening 25 of the stripper plate 11 in downward direction into the annular gap 14. As soon as dough has entered this annular gap 14, the sensing head 24 contacts the dough present within the annular gap 14 and is thus lifted. This results in a pivotal movement of the pivotal lever 22 around the axis 23, whereby a switch 26 is closed, which can be a usual limiting switch and is arranged in the electrical circuit 27 of a disconnecting remote-control switch in its turn arranged within the mains connection of the machine. If no dough is present within the annular gap 14, the sensing head 24 assumes the position shown in dashed lines which can be limited by an abutment 28. Under this condition, the switch 26 is in open position.

Of course, such a mechanical embodiment of the sensor can be realized and, respectively, arranged in various manner, for example externally around the metal sheet of the stripper plate 11. Also a plurality of pivotal levers 22 can be arranged along a circle around the molding pestle 7 or, respectively, the opening 12. A further possibility is to design the sensors 17 as a ring of variable height position which senses the total annular area of the annular gap 14 and is guided for being moved in upward and downward direction. In this manner all areas surrounding the normal expelling area of the dough can be sensed.

Figure 5:
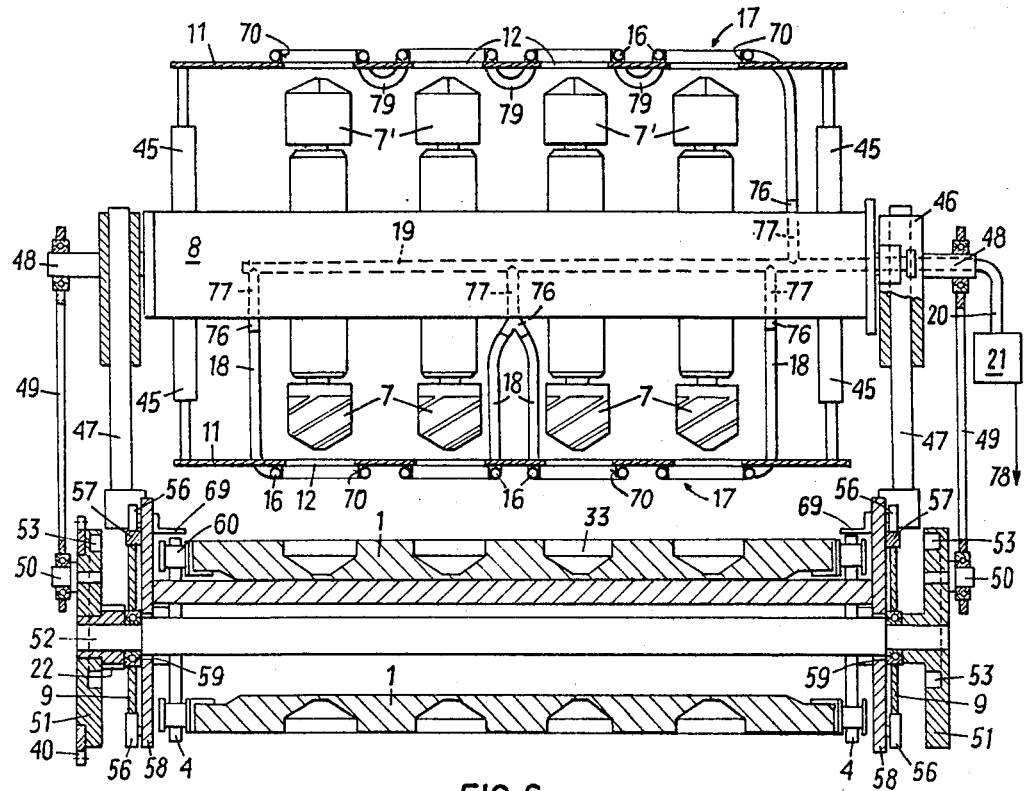
FIG. 5 is a section along the line V—V of FIG. 4.
Figure 4:
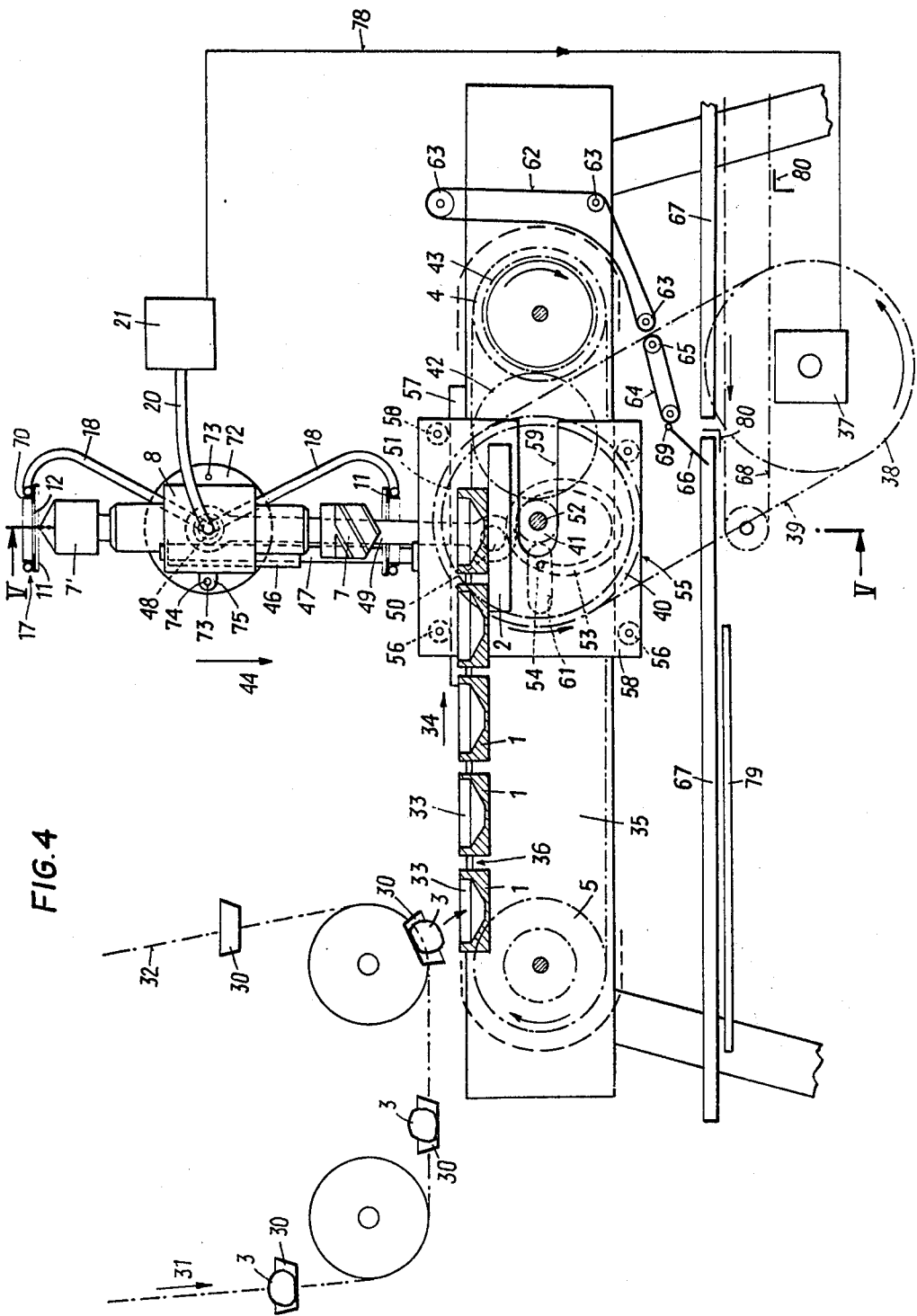
FIG. 4 shows another preferred embodiment of the invention, partially in section.

The embodiment according to FIGS. 4 and 5 is similar to that according to FIGS. 1 and 2, but has a continuous advance of the chain of molding dishes 1. The dough pieces 3 to be molded are fed after pre-roofing in a roofing chamber by means of hangers 30 in direction of the arrow 31, which hangers 30 are pivotally fixed to an endless chain 32. A tilting means (not shown) of any desired construction tilts the hangers 30 whereby the dough pieces 3 slide off the hangers 30 and fall into the hollow 33 of the respective molding dish 1. The molding dishes 1 are fed in an endless chain 36 around the return wheels 4, 5 continuously in direction of the arrow 34. The return wheels 4,5 are mounted for rotation in the frame 35 of the machine. The chain 36 is driven by a motor 37 fixed to the frame 35, which motor 37 drives a sprocket wheel 38 driving a chain 39 which drives a sprocket wheel 40, on the shaft of which there is mounted a pinion 41 which drives via a pinion 42 a pinion 43 mounted on the shaft of the return wheel 4. The speeds of the molding dish chain 36 and of the chain 32 are so chosen that the dough pieces 3 delivered by the hangers 30 always fall exactly into the hollows 33 of the dough dishes 1. Each dough dish 1 has four hollows 33 arranged in a row extending transversely to the moving direction (arrow 34). The machine has two rows of pestles 7, 7' acting on the dough pieces 3 lying in the hollows 33. The pestles 7 give the dough pieces a shape suitable for kaisersemmels, the pestles 7' however, give the dough pieces 3 a shape suitable for starsemmels (Sternsemmeln). The pestles 7 producing kaisersemmels are so mounted on the carrier 8 that they are turned around their axis when the carrier 8 moves down (arrow 44) and when the pestles 7 contact the upper surface of the dough pieces 3. Further, the carrier 8 has a stripper plate for each set of pestles 7, 7', which stripper plate is resiliently mounted on two rods 45 (FIG. 5) which can be resiliently elongated telescopically. Each stripper plate 11 has an opening 12 for each pestle 7 or 7' through which opening the pestle 7 or 7' passes when the carrier 8 is moved downwardly. The stripper plate 11 serves for stripping off dough pieces adhering to the upwardly moved pestles 7 or 7', so that these dough pieces fall back into the hollows 33. The carrier 8 is fixed to sleeves 46 which can be moved up and down along guiding rods 47 (FIG. 5) and carry pins 48 rotatably fixed to connecting rods 49, the other ends of which are rotatably connected to plugs 50 mounted on cam discs 51 arranged on both sides of the frame 35 and mounted for rotation therein by means of a common shaft 52. Each cam disc 51 has on its surface facing the frame 35 a groove 53 into which a guide roller 54 (FIG. 4) is guided which is rotatably mounted on a carriage 55 guided by means of rollers 56 along rails 57 of the frame 35. The carriage 55 has two lateral plates 58 connected to each other by a middle portion forming the support 2 for the dough dishes 1 during molding of the dough pieces. The plates 58 have slots 50 so that the carriage 55 can be reciprocally mounted relatively to the frame 35, the slots 59 being moved relatively to the shaft 52 during this motion. The sprocket wheel 40 for driving the molding dish chain 36 is mounted on the shaft 52 or on a cam disk 51 fixed to this shaft. The molding dishes 1 extend transversely to the moving direction of the chain 36 and are fixed on both sides of the machine to roller chains 60 driven by the return wheel 4 which is a sprocket wheel.

The guiding rods 47 for the carrier 8 are fixed to the lateral plates 58 of the carriage 55. The guide rollers 54 project through slots 61 (FIG. 4) of the frame 35.

The dough pieces 10 molded by the pestles 7 or 7' are secured in the region of the return wheel 4 against falling out of the hollows 33 by a transfer element 62 (FIG. 4) constituted by an endless conveyor belt which runs over guide rollers 63 and along a section of the surface of the mold dish chain 36. The molded dough pieces 10 transferred from the mold dishes 1 to the transfer element 62 are transferred from this element 62 to a further endless transfer band 64 which can be reciprocally shifted in the direction of its return roller 65 in synchronism to the feeding of the dough pieces. This transfer band leads the dough pieces to a flap 66 on which the dough pieces slide to deposition plates 67 which are conveyed on a support 79 by means of a conveyor belt 68 provided with take along means 80 under the molding device of the machine in the frame 35. In order to provide the deposition plates 67 with upset margins, the flap 66 is pivotally mounted on its upper edge 69 in the frame 35. The above mentioned reciprocating movement of the transfer band 64 serves for a zigzag deposition of the delivered dough pieces on the deposition plates 67 thus obtaining a space-sparing deposition on these plates 67.

The dough pieces lying in the molding dishes 1 become molded by means of the molding pestles 7 or 7', respectively, which are driven for an up and down movement together with the molding tool carrier 8 by means of the connecting rods 49. Simultaneously with this movement the carriage 55 carrying the guiding rods 47 is shifted in a reciprocating manner by means of the guide rollers 54 running in the grooves 53 of the cam discs 51, which guide rollers 54 are mounted on this carriage. This movement is so synchronized with the advance movement of the molding dish chain 36 that molding of the dough pieces 3 by means of the pestles 7 or 7' is done unobjectionable. In order to avoid that during the downward movement of the carrier 8 the stripper plate 11 contacts the dough pieces 3 to be molded, stops 70 (FIG. 5) may be provided on the plates 58 of the carriage 55, which stops limit the downward movement of the stripper plate 11. However, it is also possible to provide stops 70 (FIGS. 4,5) on the stripper plate 11 in the region of the margin of each opening 12 which stops 70 protrude downwardly and cooperate with those regions of the molding dishes 1 which surround the hollows 33.

In order to change the machine from an operation with the molding pestles 7 to an operation with the molding pestles 7' the carrier 8 is tilted around its horizontal axis defined by the pins 48, so that the desired kind of pestles protude from the carrier 8 towards the molding dish chain 36 and is thus in position ready for operation. The pins 48 are mounted for rotation in the sleeves 46 and a plate 72 is provided on one front end of the carrier 8, which plate 72 has two notches 73 corresponding to the two pestle sets 7, 7'. In these notches 73 a fixing bolt 74 may be inserted which protrudes through a protusion 75 mounted on the sleeve 46 facing the plate 72. In order to change the machine from producing the one kind of rolls or pastry (for example kaisersemmels) to the other kind of rolls or pastry (for example starsemmels) it is only necessary to pull the fixing bolt 74 out of the notch 73 coordinated to the pestles 7 for molding kaisersemmels, whereupon the carrier 8 together with the pestles mounted on it can be tilted around the axis of the pins 48 so that the pestles 7' necessary for molding starsemmels are brought into the working position. After inserting the fixing bolt 74 into the starsemmel-notch 73 of the plate 72, the machine is ready for operation.

Of course the carrier 8 may carry more than two different kinds of molding pestles 7, 7' arranged radially to the axis of the pins 48, which plurality of pestle sets may be fixed in their operating position in an analogous manner.

The sensor means 17 for each pestle 7 or 7' in the embodiment according to FIGS. 4 and 5 corresponds substantially to that described in connection with the embodiment of FIGS. 1 and 2. As shown in detail in FIG. 5, the detailed construction of the sensor means 17 can be effected in different manners. FIG. 5 shows annular hose pieces 16 for the pestles 7, which hose pieces 16 surround the openings 12 of the stripper plate 11 and are arranged in a circle surrounding the stops 70. Each of these hose pieces 16 is connected via a hose 18 to a connecting piece 76 on the carrier 8, from which connecting piece a radial channel 77 leads to the central axial channel 19 which extends in axial direction of the carrier 8 into one of the pins 48, where this channel 19 is connected to the hoseline 20 and by means of this to the pressure switch 21. A lead 78 connects the pressure switch 21 to the motor 37. If one of the sensor means 17 comes into contact with an excessive amount of dough present in the hollow 33, particularly more than one dough piece 3, 3' (see FIG. 2), the pressure in the hose line 20 is increased, which actuates the pressure switch 21 to create an electric pulse which runs along the lead 78 and stops the motor 37.

The sensor means 17 associated to the pestles 7' is somewhat different from that of the pestles 7. For the pestles 7', ring-shaped or bow-shaped hose pieces 16 are connected to each other by connecting hoses 79' so that the sensor means 17 are connected to each other in series. This series connection is connected to a connecting piece 16 by a hose line 18 and from this connecting piece 16 a channel 77 leads to the central channel 19 of the carrier 8. This embodiment has the advantage over that described for the pestles 7 that only one single connecting piece 76 and one single channel 19 is required and that the central channel 19 may run along only a part of the total length of the carrier 8.

Figure 6:
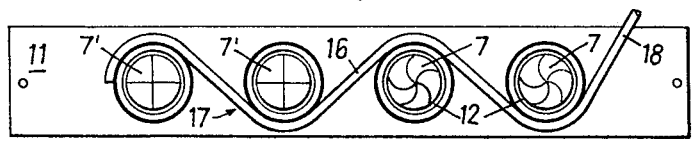
FIG. 6 shows another embodiment of the sensor means.

In FIG. 6 a further embodiment is shown when viewing to the stripper plate 11 from below. The sensor means 17 is constituted by a hose 16 which is associated to all openings 12 and runs along these openings along a serpentine line and is connected to the hose line 18 in the zone of the last opening 12. In this embodiment not the total marginal area of the hollow 33 is surveyed, but experience has shown that this is sufficient.

The flexible hose lines 18, for example of rubber as those hoses of the sensor means 17, allow the relative movement of the stripper plate 18 with respect to the carrier 8 without any problem. However, a tube line, the length of which varies in operation, for example a telescope tube, may also be used.

According to the embodiment of FIG. 6 two pestles 7 for kaisersemmels and two pestles for starsemmels are arranged in a row. Thereby, if the total number of semmels to be produced is comparetively low, starsemmels and kaisersemmels can be produced simultanously.

It is obvious for one skilled in the art that a great number of variations from the embodiments illustrated and described can be made without deviating from the scope of the claims.

What is claimed is:

1. A dough molding or forming machine, having a drive means for at least one upwardly and downwardly movable molding or forming tool acting on a dough portion resting on a support, a normal expelling area on this support into which the dough portion is expelled during normal operation of said molding or forming tool, comprising at least one sensor means associated with a portion of said support which is located outside of said normal expelling area of the dough portion, said sensor means being able to sense dough expelled in an excessive amount by the downward movement of said forming or molding tool, and a signal means associated with said sensor means for creating a signal indicating said excessive amount of dough.

2. A machine as claimed in claim 1, wherein said signal means is a switch for disconnecting said drive means.

3. A machine as claimed in claim 1, wherein said sensor means is arranged along an arc around said normal expelling area of the dough portion.

4. A machine as claimed in claim 1, further comprising a stripper plate having a bottom surface facing the support, said sensor means being mounted on this bottom surface.

5. A machine as claimed in claim 1, further comprising a molding or forming tool carrier for carrying at least two molding or forming tools and being arranged for being swivelled around a horizontal axis, an individual stripper plate associated with each of these molding or forming tools, and a pressure sensor means provided on each of these stripper plates, all pressure sensor means being connected to a common conduit externally passed through the axis of the molding or forming tool carrier.

6. A machine as claimed in claim 1, said signal means comprising a time delay element, so that, when the drive means is disconnected, said molding or forming tool is in lifted position.

7. A machine as claimed in claim 1, wherein said support is a molding dish.

8. A machine as claimed in claim 1, wherein said sensor means comprise a pivotally mounted lever being able to be moved by the expelled excessive amount of dough and a switch means for disconnecting the drive means for said molding or forming tools, said switch means being located within the pivotal area of said lever.

9. A machine as claimed in claim 8, further comprising a stripper plate for carrying said lever and said switch means.

10. A machine as claimed in claim 1, wherein said sensor means comprises a hose filled with a pressure fluid and connected to a switch being able to be actuated by a pressure change in said pressure fluid.

11. A machine as claimed in claim 10, wherein said hose consists of resilient material.

12. A machine as claimed in claim 11, wherein said resilient material is rubber.

* * * * *